United States Patent [19]

Kimoto et al.

[11] Patent Number: 4,519,056
[45] Date of Patent: May 21, 1985

[54] OPTICAL DISK APPARATUS

[75] Inventors: Katsumi Kimoto; Atsushi Ishihara, both of Yokohama, Japan

[73] Assignee: Tokyo Shibaura Denki Kabushiki Kaisha, Kawasaki, Japan

[21] Appl. No.: 473,629

[22] Filed: Mar. 9, 1983

[30] Foreign Application Priority Data

Mar. 15, 1982 [JP] Japan .................................. 57-40605
Mar. 15, 1982 [JP] Japan .................................. 57-40608

[51] Int. Cl.³ .......................... G11B 7/00; H04N 5/76
[52] U.S. Cl. ....................................... 369/43; 369/52; 369/53; 369/56; 369/57
[58] Field of Search ..................... 358/342; 369/32, 33, 369/43, 44, 47, 50, 57, 52, 53, 56

[56] References Cited

U.S. PATENT DOCUMENTS

4,067,044 1/1978 Maeda et al. ..................... 369/44 X

Primary Examiner—Robert L. Richardson
Attorney, Agent, or Firm—Cushman, Darby & Cushman

[57] ABSTRACT

A data recording apparatus is provided which has a recording/reproduction head for recording data on or reproducing the data from a recording medium, a moving mechanism for moving the recording/reproducing head on the recording medium, an error detector for detecting an error in accordance with a signal from the recording/reproduction head in the recording mode, and a control section for detecting that an access to a recording start track cannot be made by the recording-/reproduction head for recording data, for determining a track number in the vicinity of the recording start track by the recording/reproduction head in accordance with a detection result, and for controlling a moving mechanism to move the recording/reproduction head to a target track ahead of a predetermined number of tracks which correspond to a distance between the target track and the recording start track without performing recording of data on the predetermined number of tracks in accordance with a detection result from a tracking error detector.

8 Claims, 16 Drawing Figures

OPTICAL DISK APPARATUS

BACKGROUND OF THE INVENTION

The present invention relates to a data recording apparatus such as an optical disk apparatus for recording/reproducing image data.

An optical disk apparatus optically records data on or reproduces it from an optical disk by scanning the rotating optical disk with a laser beam. The optical disk receives great attention as a large-capacity memory which has never been proposed. For example, the optical disk can be applied to a large-capacity image file apparatus.

One of the optical disk apparatus of the type described above uses an optical disk with a spiral pregroove or concentric pregrooves, each of which is an array of prepits. A reproducing laser beam and an intense recording laser beam alternately illuminate the pregroove while the disk is rotating. The reproducing laser beam tracks the pregroove, and the recording beam cuts data pits in the pregroove, thus recording image data on the disk. A semiconductor laser diode keeps emitting a less intense reproducing beam, thereby tracking the pregroove all the time during the operation of the disk apparatus. When a beam modulating signal (i.e. recording pulse having a width of less than several hundred nanoseconds) is supplied to the laser diode, the laser oscillator emits an intense recording beam for the period of time equal to the width of the recording pulse. The recording beam illuminates the pregroove and cuts a data pit in the pregroove.

The data recording on the optical disk may be deteriorated with time and may eventually be destroyed. In order to record new image data in that portion of the pregroove which has not been used, an optical head including the semiconductor laser diode must be brought to the starting track or the last recorded track (i.e. "−1 track"), or the recording end address. If the tracking data previously recorded have been destroyed or distorted, a tracking error is unavoidable. Due to the tracking error the optical head cannot be moved to the starting track or the −1 track.

Furthermore, in the optical disk apparatus described above, a tracking error tends to occur when a strong impact is applied on the apparatus while the optical head is recording data on a nonrecorded area of the disk. The laser beam is then incident on the track on which data is already recorded, thus resulting in overlay recording.

SUMMARY OF THE INVENTION

It is an object of the present invention to provide a data recording apparatus which allows proper recording even if the final recording track of previously recorded data is deteriorated over time.

It is another object of the present invention to provide a data recording apparatus which allows continuous recording even if a recording error such as overlay recording or a tracking error occurs.

In order to achieve the above object of the present invention, there is provided a data recording apparatus, comprising:

(a) recording/reproduction head means for recording data on or reproducing the data from a recording medium on which a plurality of tracks are formed at a predetermined track pitch;

(b) moving means, connected to said recording/reproduction head means, for moving said recording/reproducing head means on the recording medium;

(c) position detecting means having a scale of a predetermined scale pitch corresponding to positions of the recording medium;

(d) scale translating means for translating a desired track number to a scale value corresponding to a scale value detected by said position detecting means in accordance with the track and scale pitches;

(e) driving means, connected to said scale translating means, said position detecting means and said moving means, for driving said moving means until the scale value from said scale translating means coincides with the scale value detected by said position detecting means; and (f) controlling means, connected to said recording/reproduction head means, said position detecting means, said scale translating means, and said driving means, for detecting that an access to a recording start track cannot be made by said recording/reproduction head for recording the data, for determining a track number in the vicinity of the recording start track by said recording/reproduction head means in accordance with a detection result, and for controlling said recording/reproduction head means, said position detecting means, said scale translating means and said driving means so as to move said recording/reproduction head means to a target track ahead of a plurality of tracks which correspond to a distance between the target track and the recording start track.

BRIEF DESCRIPTION OF THE DRAWINGS

Other objects and features of the present invention will be apparent from the following description taken in connection with the accompanying drawings, in which:

FIGS. 5A through 5E are timing charts explaining the detector operation for detecting overlay recording, in which

DETAILED DESCRIPTION OF THE PREFERRED EMBODIMENTS

Figure 1A:
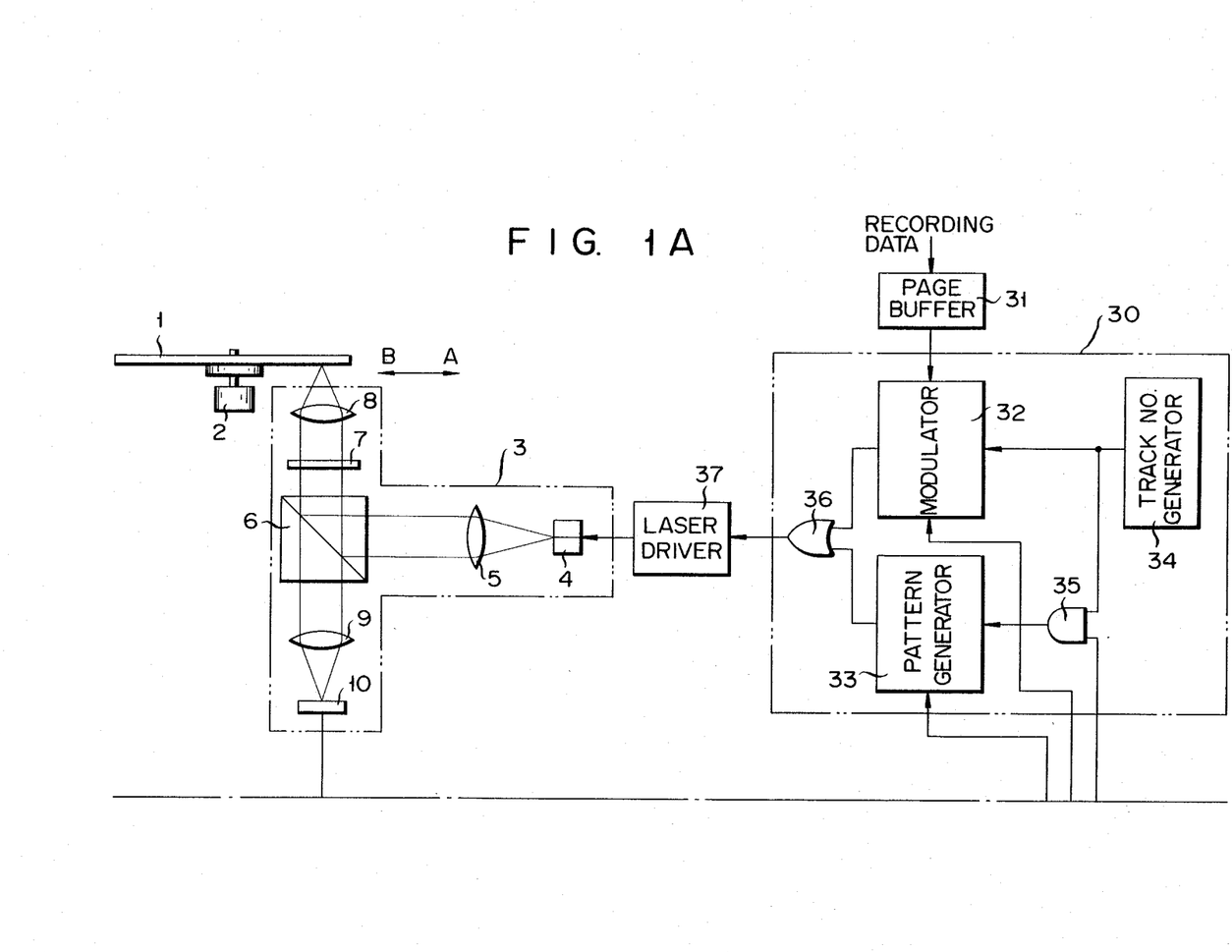
FIGS. 1A and 1B are block diagrams showing a data recording apparatus according to a first embodiment of the present invention.
Figure 1B:
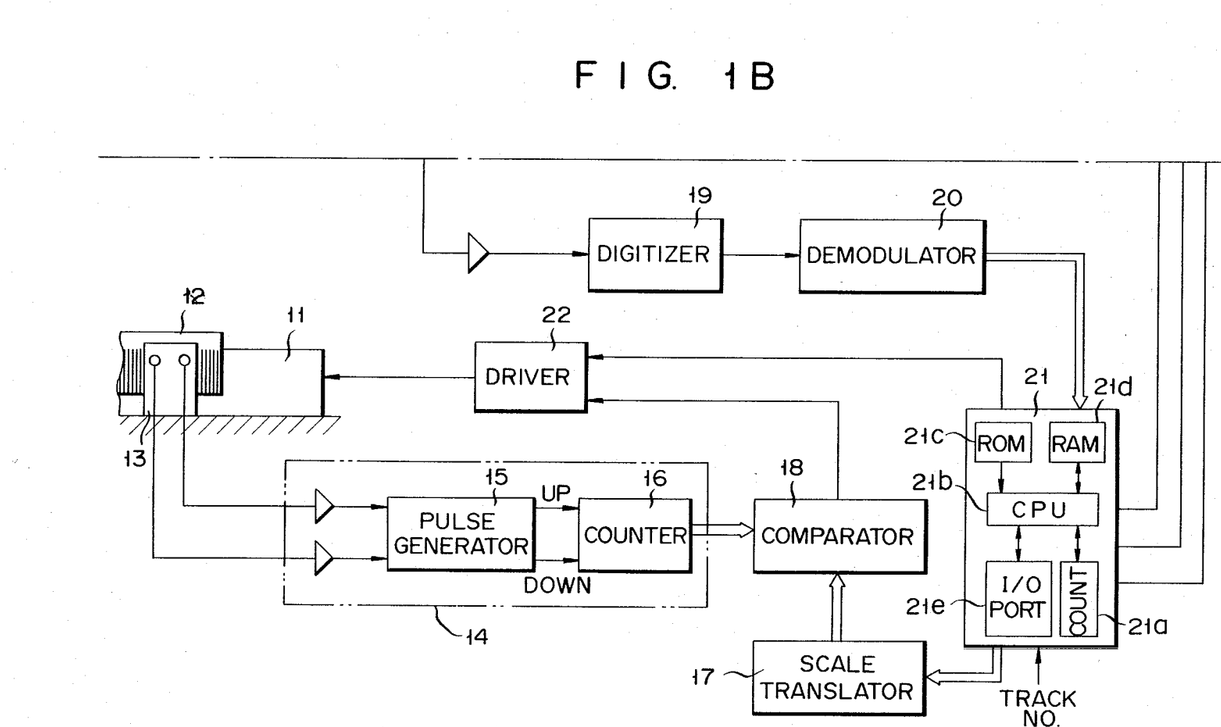
Figure 2A:
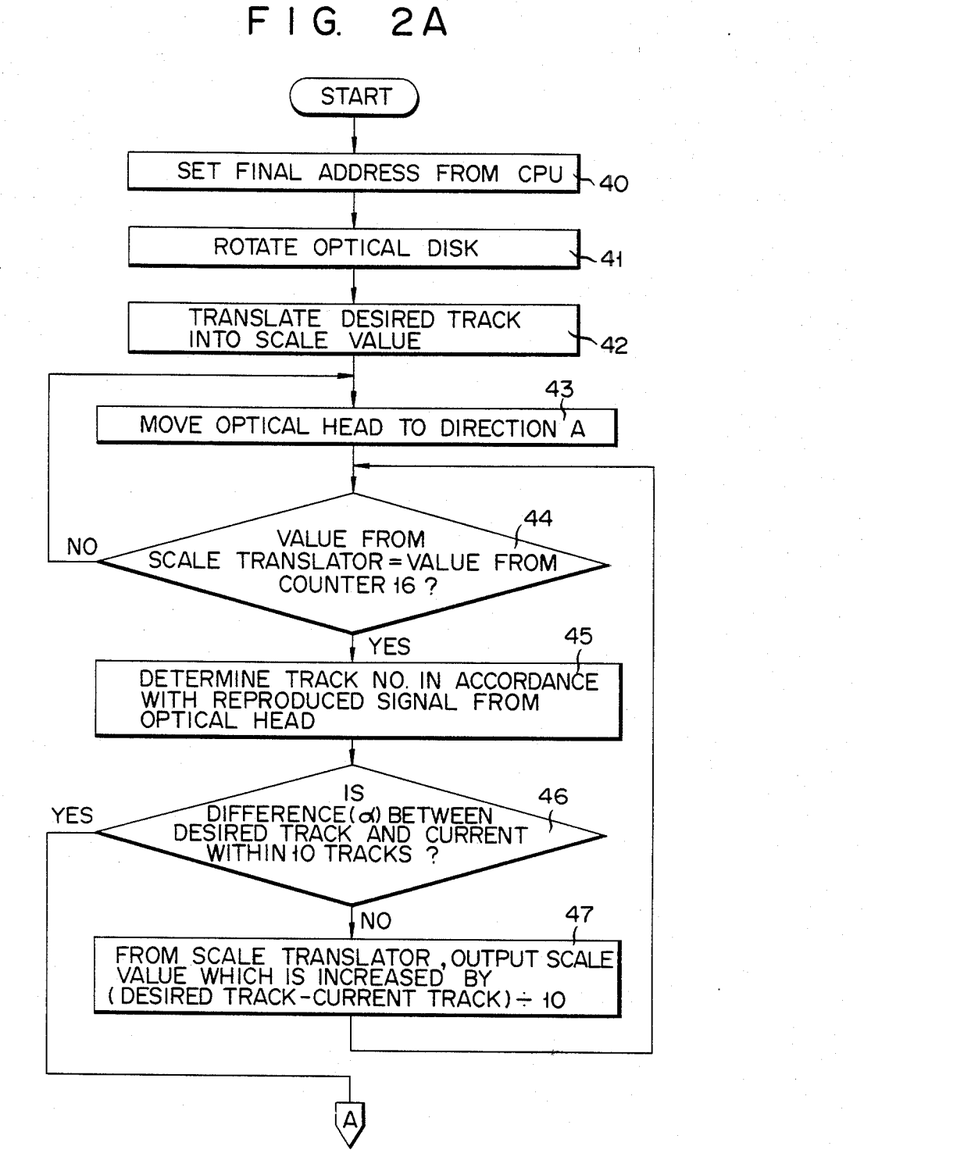
FIGS. 2A through 2D are flow charts explaining the mode of operation of the data recording apparatus shown in FIGS. 1A and 1B.
Figure 2B:
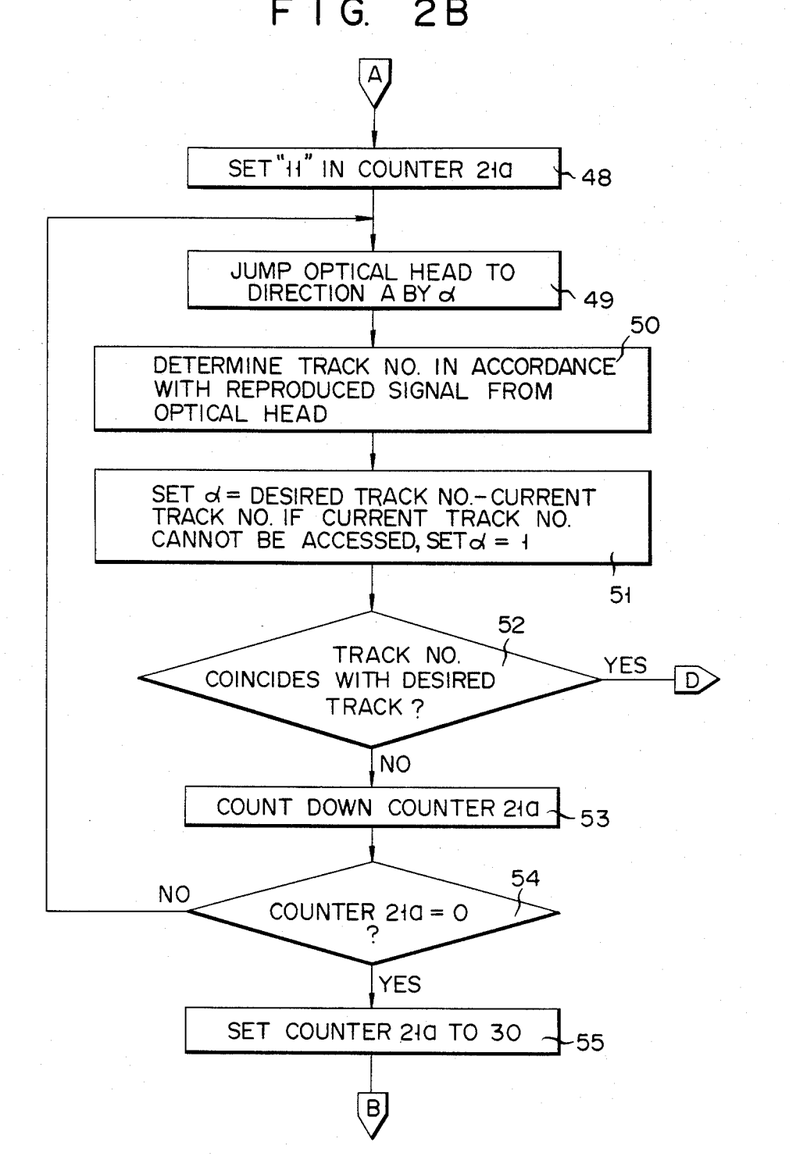
Figure 2C:
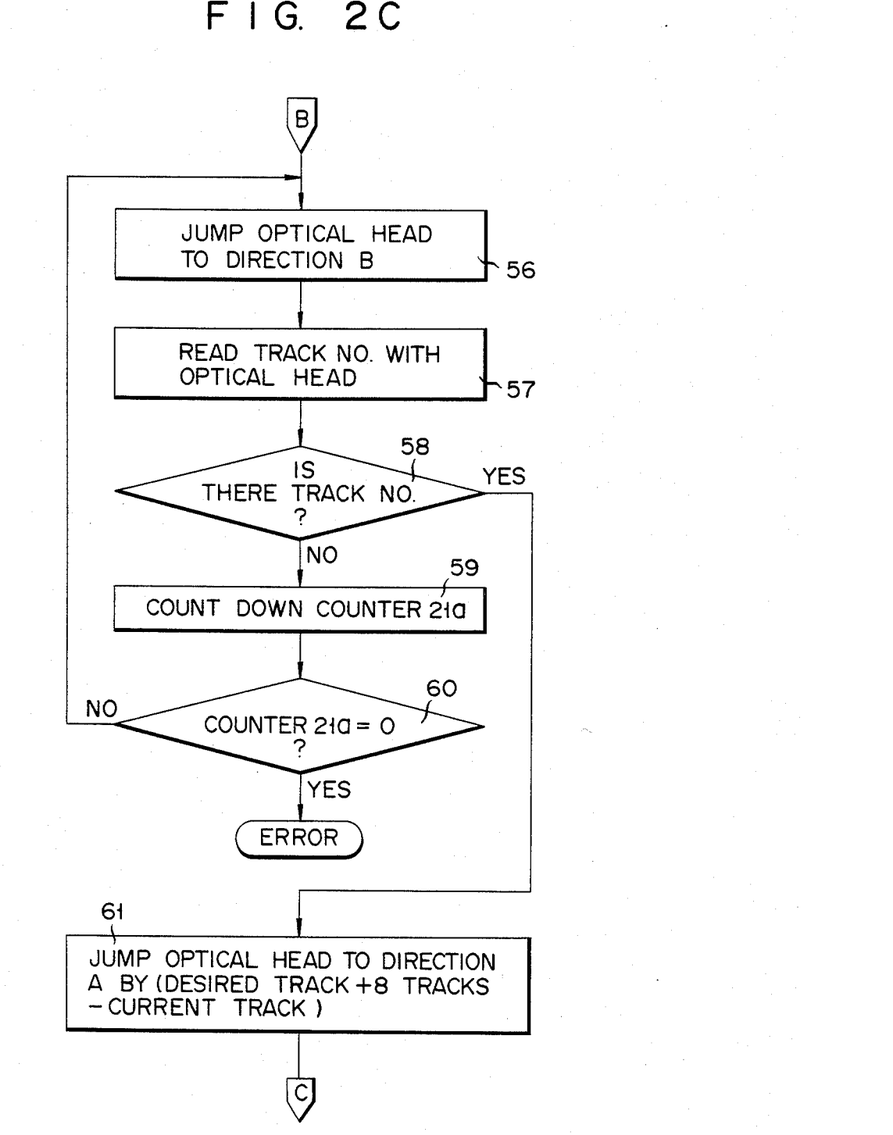
Figure 2D:
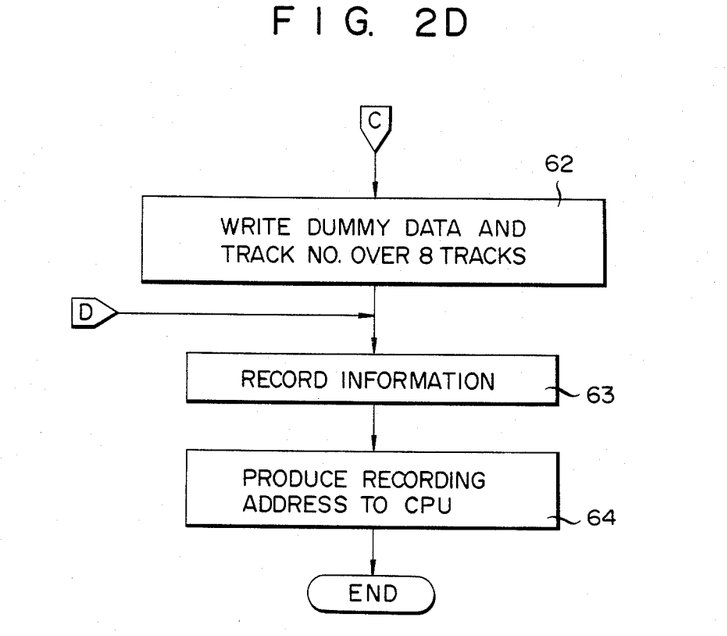

Referring to FIGS. 1A and 1B, pregrooved recording tracks are spirally formed in the lower surface of an optical disk (recording medium) 1. The optical disk 1 is rotated by a motor 2. An optical recording/reproduction head 3 is driven by a linear motor (moving mechanism) 11 to be described in detail later. The optical head 3 comprises a semiconductor laser diode 4 for oscillating a laser beam, a collimator lens 5, a deflection beam splitter 6, a λ/4 plate 7, an objective lens 8, a focusing lens 9, and a photosensor such as a photodiode 10 for photoelectrically transducing the reflected light by the optical disk 1 to an electrical signal. The laser diode 4 is controlled and driven by a laser driver 37 to be described later. The level of the output signal from the laser diode 4 can be switched so as to produce a reproducing beam and a recording beam which have different energy levels. The main beam radiated from the laser diode 4 is collimated by the collimator lens 5 and is guided to the objective lens 8 through the beam splitter 6 and the λ/4 plate 7. The laser beam from the objective lens 8 is focused to form a beam spot of about 1 μm diameter on the lower surface of the optical disk 1. The laser beam reflected by the optical disk 1 is guided to the focusing lens 9 through the objective lens 8, the λ/4 plate 7 and the beam splitter 6. The beam is then focused on a light-receiving surface of the photodiode 10. The optical signal is then converted by the photodiode 10 to an electrical signal.

The optical head 3 is mounted on a movable portion of the DC linear motor (moving mechanism) 11 also having a stationary portion. The optical head 3 is moved by the linear motor 11 in the radial direction of the optical disk 1 at a constant velocity. A detection section 13 detects the position of an optical scale 12 fixed on the movable portion in accordance with the overlap grating type detection method and produces two types of detection signals having two phases in accordance with movement of the optical head 3. A position signal processing circuit 14 processes the output signals from the detection section 13 in a predetermined manner, thereby producing a position signal. The position signal processing circuit 14 comprises: a pulse generator 15 for generating a position pulse in accordance with the two types of detection signals which have different phases; and a counter 16 for counting up or down the pulses from the pulse generator 15. A scale translator 17 translates track number data from a control section 21 (to be described later) into a scale value corresponding to a scale value of the optical scale 12. A comparator 18 compares the scale value from the scale translator 17 and the scale value from the position signal processing circuit 14. A digitizer 19 converts an analog signal from the photodiode 10 to a digital signal. A demodulator 20 demodulates the output signal from the digitizer 19. The control section 21 comprises a microcomputer which has a CPU 21b, ROM 21c, a RAM 21d and an I/O port 21e. The control section 21 also includes a counter 21a. An 8-bit microcomputer 8085 manufactured by Intel Corporation, USA may be used as the microcomputer. The control section 21 controls the overall operation of the apparatus. The control section 21 receives track number data from a CPU (not shown) of the main unit and supplies the track number data to the scale translator 17. When a difference between the track number, data of which is supplied from the demodulator 20, and the desired track falls within a range of "10", the control section 21 produces a track jump pulse in accordance with the difference. The control section 21 also supplies a control signal to a modulation circuit 30. The counter 21a is arranged in the control section 21 to detect an access error occurring when the optical head 3 is moved to the desired track. When the access error occurs, the control section 21 causes the optical head 3 to move in the direction of arrow B, so that the optical head 3 detects the recording track. When a track number corresponding to the position of the optical head 3 is detected, the control section 21 causes the optical head 3 to move from the currently detected track to a track which is spaced apart therefrom by 8 tracks (dummy seek). After the optical head 3 reaches the track in the dummy seek operation, dummy data and track numbers are recorded on the 8 dummy tracks. The dummy data allows access of the optical head 3 even if the optical head 3 jumps tracks. A driver 22 drives the linear motor 11 in response to the output signal from the comparator 18 or from the track jump pulse from the control section 21. The optical head 3 is then moved in the radial direction of the optical disk 1 in accordance with the constant linear velocity, in the direction of arrows A and B. The modulation circuit 30 comprises a modulator 32 for performing MFM modulation, a pattern generator 33 for generating dummy data, a track number generator 34 for generating track number data, an AND gate 35, and an OR gate 36. In the modulation circuit 30, one-page image data sequentially supplied from a page buffer 31 are MFM-modulated. The modulated data or the dummy data are produced by the modulation circuit 30. More particularly, the modulator 32 modulates the recording data from the page buffer 31 or the track number data from the track number generator 34 in accordance with the control signal from the control section 21. The modulated signal is then produced through the OR gate 36. In response to the control signal from the control section 21 the pattern generator 33 supplies, through the OR gate 36, the track number data supplied from the AND gate 35 or the dummy data.

The output signal from the modulation circuit 30, that is, the output signal from the OR gate 36 is supplied to a driver 37. The driver 37 controls and drives the laser diode 4 in response to the supplied data.

The operation of the data recording apparatus described above will be explained with reference to the flow charts in FIGS. 2A to 2D. In step 40, the final track number data is supplied from a CPU (not shown) to the control section 21. The control section 21 supplies the track number data to the scale translator 17. In step 41, the optical disk 1 is rotated, and the flow advances to step 42. In step 42, the scale translator 17 translates the track number data into a corresponding scale value. In step 43, the optical head 3 is moved in the direction of arrow A. The flow advances to step 44. In step 44, the driver 22 is driven until the scale value from the scale translator 17 coincides with the count value from the counter 16. The driver 22 then drives the linear motor 11. The optical head 3 is thus moved in the direction of arrow A. In this condition, the optical disk 1 is driven at the constant linear velocity. Every time the optical head 3 corresponds to a scale value of the optical scale 12, the pulse generator 15 produces a signal in response to a detection signal of a phase corresponding to the scale value. The counter 16 then counts the signal. When the scale value from the counter 16 coincides with the count value of the scale translator 17, the comparator 18 produces a coincidence signal to stop the driver 22. The driver 22 then stops the linear motor 11. The optical head 3 is therefore stopped. The optical head 3 radiates the reproducing beam on the optical disk 1 under the control of the control section 21. The light reflected from the optical disk 1 is converted to an electrical signal which is then supplied to the digitizer 19. The digitizer 19 converts the electrical signal (i.e., reproduced signal) to a digital signal. The digital signal is demodulated by the demodulator 20. The demodulated signal is supplied to the control section 21. In step 45, the control section 21 determines the track number in accordance with the reproduced signal. In step 46, the control section 21 compares the detected track number and the desired track number. If a difference between the detected track number and the desired track number exceeds "10" tracks, the detected track number is converted to a scale value corresponding to the difference, which is supplied to the scale translator 17. The flow then returns to step 44. In step 44, the driver 22 drives the linear motor 11 until the comparator 18 detects coincidence between the scale value from the scale translator 17 and the count value of the counter 16. However, when it is determined in step 46 that the difference falls within a range of "10", the control section 21 sets the count of the counter 21a to "11" in step 48, and the flow advances to step 49. In step 49, the control section 21 supplies the track jump pulses corresponding in number to the number of tracks to the driver 22. In response to the track jump pulses, the driver 22 causes the optical head 3 to jump in the direction of arrow A track by track. Steps 49 to 54 are repeated. When the optical head 3 is moved to the desired track, the control section 21 supplies the control signal to the modulator 32. The modulator 32 modulates the data in the page buffer 31 from the first bit to the last bit and produces a modulated signal. The modulator 32 also produces track number data. As a result, the laser driver 37 switches the reproducing beam to the recording beam in response to the signal from the modulator, thereby forming data pits in the pregrooves.

Now when the storage content of the final recording track is deteriorated over time, the desired track number cannot be read out even if the optical head 3 jumps to the desired track. The count of the counter 21a is reset to "0". In step 55, the control section 21 sets the count "30" in the counter 21a and supplies the track jump pulses to the driver 22. In step 56, the driver 22 causes the optical head 3 to jump in the direction of arrow B track by track. At the same time, the reproduced signal from the photodetector 10 is supplied to the control section 21 through the digitizer 19 and the demodulator 20. When the control section 21 detects the track number, the control section 21 supplies the driver 22 with track jump pulses which correspond to the track number which is eight tracks ahead of the desired track. The driver 22 then causes the optical head 3 to jump in the direction of arrow A track by track in accordance with the track jump pulses. In this condition, since the control section 21 does not supply any control signal to the modulation circuit 30, the above operation is regarded as the 8-track dummy seek from the desired track. Thereafter, the control section 21 produces the control signals to the pattern generator 33 and the AND gate 35 and drives the driver 22. The pattern generator 33 produces the dummy data and the track number data from the track number generator 34 at time intervals of 0.5 m/s. In response to the data supplied from the pattern generator 33, the laser driver 37 switches the reproducing beam to the recording beam, thereby forming the data pits of the dummy data and the track number data in the pregrooves. Thus, recording of the dummy data and the track number data is performed on the eight dummy tracks. In this manner, the dummy data is recorded on the eight tracks, so that the optical disk 1 can access one of the dummy tracks even if the recording data is partially omitted. Thereafter, the control section 21 supplies the control signal to the modulator 32. In response to this control signal, the modulator 32 modulates the data signal in the page buffer 31 starting from the first bit. At the same time, the modulator 32 produces the track number data. The laser driver 37 switches the reproducing beam to the recording means in response to the signal supplied thereto, thereby forming data pits in the pregrooves.

Even if pinholes are formed in the recording film along a plurality of tracks due to deterioration of the optical disk over time, new image data can be properly recorded in a position different from the pinhole position.

Figure 3A:
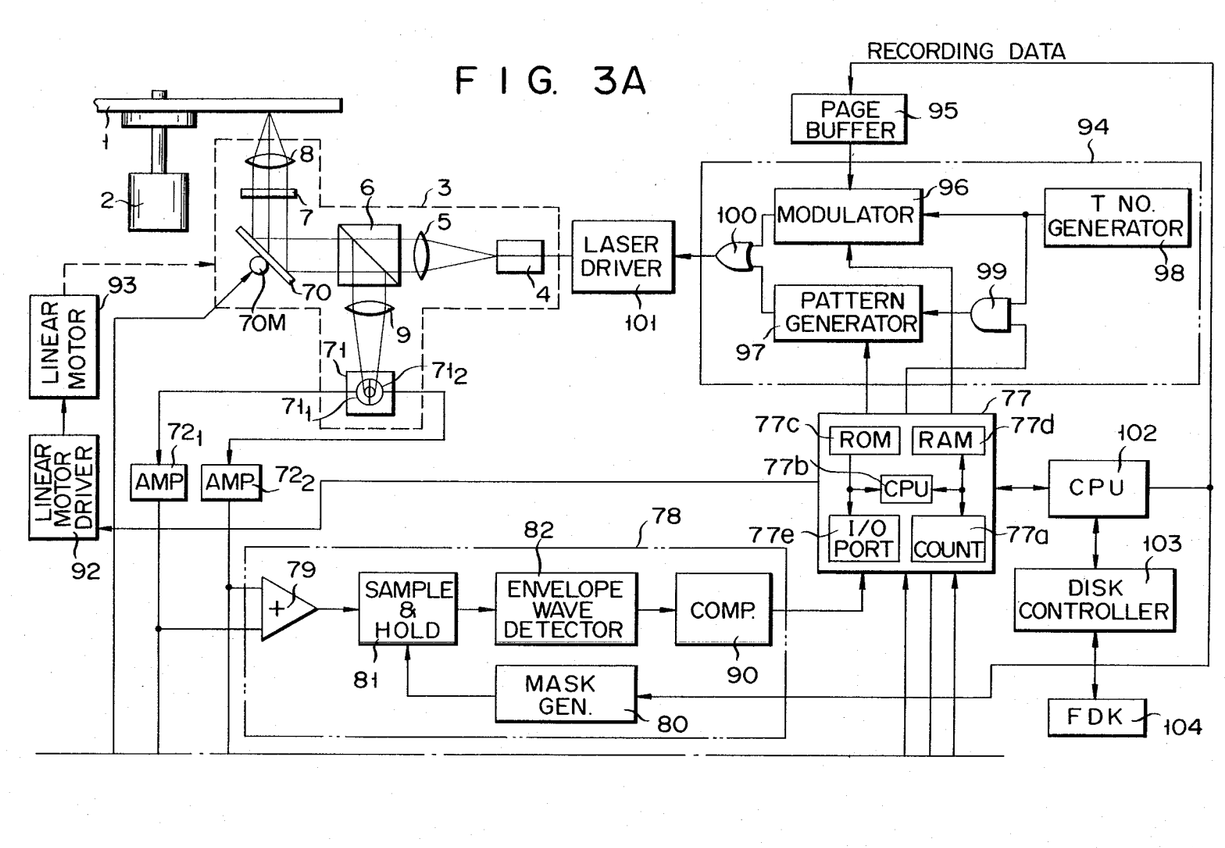
FIGS. 3A and 3B are block diagrams showing a data recording apparatus according to a second embodiment of the present invention.
Figure 3B:
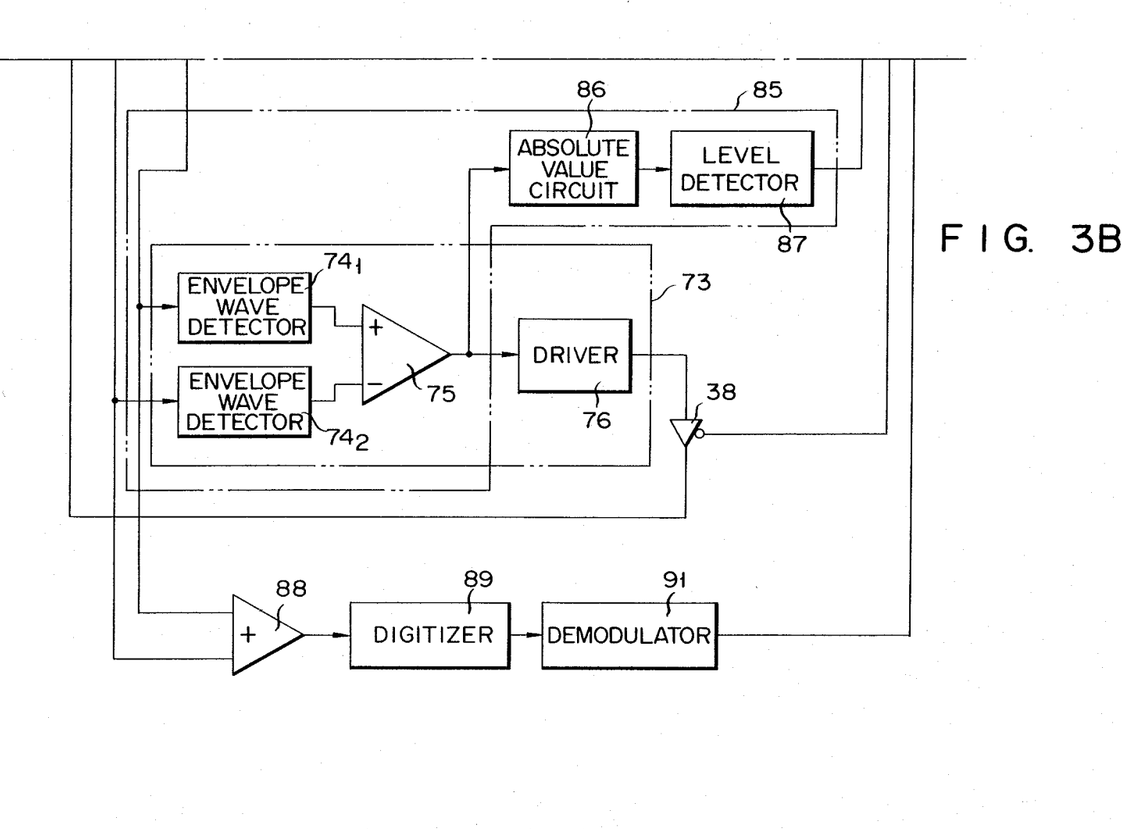

FIGS. 3A and 3B are block diagrams of a data recording apparatus according to a second embodiment of the present invention. The same reference numerals used in FIGS. 1A and 1B denote the same parts in FIGS. 3A and 3B. Referring to FIGS. 3A and 3B, an optical head 3 is driven by a linear motor mechanism 93 (to be described later) in the optical direction of an optical disk 1 at a constant linear velocity. The optical head 3 includes a semiconductor laser diode 4, a collimator lens 5, a deflection beam splitter 6, a tracking control galvano-mirror 70, a $\lambda/4$ plate 7, an objective lens 8, a focusing lens 9 and a two-split beam detector 71. The laser diode 4 is controlled and driven by a laser driver 101 to be described later. The oscillation output from the laser diode 4 has two levels corresponding to the reproducing beam and the recording beam which are switched as needed. The main beam from the front side of the laser diode 4 is collimated by the collimator lens 5. The collimated beam is then transmitted to the objective lens 8 through the galvano-mirror 70 and the $\lambda/4$ plate. The beam is then focused by the objective lens 8 to have a beam spot of about 1 $\mu$m diameter. The focused beam is then radiated on the lower surface of the optical disk 1. The light reflected by the optical disk 1 is guided to the focusing lens 9 through the objective lens 8, the $\lambda/4$ plate 7, the galvano-mirror 70, and the beam splitter 76. The light is then focused on the central portion of the light-receiving surface of the two-split beam detector 71. The focused beam is then converted to an electrical signal.

Output signals from light-receiving elements $71_1$ and $71_2$ which comprise the two-split beam detector 71 are amplified by preamplifiers $72_1$ and $72_2$, respectively. The amplified signals are then supplied to a tracking servo circuit 73. The tracking servo circuit 73 detects a radial position error of the reproducing beam radiated on the track of the optical disk 1. A driving coil 70M of the galvano-mirror 70 is driven in accordance with a detection signal from the tracking servo circuit 73. The galvano-mirror 70 is then rotated to properly trace the track in accordance with the detection signal. The tracking servo circuit 73 comprises envelope wave detectors $74_1$ and $74_2$ for detecting envelopes of the signals from the light-receiving elements $71_1$ and $71_2$, a comparator 75 for comparing the output signals from the envelope wave detectors $74_1$ and $74_2$ and producing a signal corresponding to a difference therebetween, and a driver 76 for driving the driving coil 70M in response to the output signal from the comparator 75. The output from the tracking servo circuit 73 passes through a gate circuit 38 or is interrupted by the gate circuit 38 under the control of a control section 77.

The output signals from the preamplifiers $72_1$ and $72_2$ are supplied to an overlay recording detector 78. The overlay recording detector 78 detects that the recording laser beam corresponds to the recorded track on the optical disk 1. The detector 78 comprises an adder 79 for adding the output signals from the light-receiving elements $71_1$ and $71_2$, a mask generator 80 for generating a mask signal corresponding to the recording data pulse, a sample and hold circuit 81 for performing sampling and holding in accordance with an output signal from the mask circuit 80, an envelope wave detector 82 for detecting the envelope of the output signal from the sample and hold circuit 81, and a comparator 90 for comparing the output signal from the envelope wave detector 82 and the reference signal having a predetermined slice level. The sample and hold circuit 81 performs sampling or is turned on when the mask signal is set at logic level "0" in the reproduction mode (oscillation of the reproducing beam). The sample and hold circuit 81 then produces the output from the adder 79. However, the sample and hold circuit 81 performs holding or is turned off when the mask signal has logic level "1" in the recording mode (oscillation of the recording beam). The sample and hold circuit 81 then holds and produces the output immediately preceding output from the adder 79.

The output signals from the preamplifiers $72_1$ and $72_2$ are also supplied to a tracking error detector 85. The tracking error detector 85 detects that the optical head 3 is shifted to a track different from the track to be recorded due to a strong impact. The tracking error detector 85 comprises the comparator 75 for comparing the outputs from the envelope wave detectors $74_1$ and $74_2$ which detect the envelopes of the output signals from the light-receiving elements $71_1$ and $71_2$, respectively, and for producing an output corresponding to the difference therebetween, an absolute value circuit 86 for determining the absolute value of the signal from the comparator 75, and a level detector 87 for detecting whether or not the output signal from the absolute value circuit 86 exceeds a predetermined level. The outputs from the preamplifiers $72_1$ and $72_2$ are added by an adder 88. A sum signal is then supplied to a digitizer 89. The digitizer 89 converts the analog signal (reproduced signal) from the adder 88 to a digital signal of logic level "0" or "1". The digital signal is then supplied to a demodulator 91. The demodulator 91 demodulates the output signal from the digitizer 89.

The output signals from the overlay recording detector 78, the tracking error detector 85, and the demodulator 91 are supplied to the control section 77. The control section 77 drives a linear motor driver 92 which, in turn, drives a linear motor mechanism 93. The optical head 3 is then moved so as to allow the beam to constantly trace the predetermined tracks. The linear motor mechanism 93 moves the optical head 3 in the radial direction of the optical disk 1. When the control section 77 receives the detection signals from the overlay recording detector 78 or the tracking error detector 85, the control section 77 causes the optical head 3 to radially move by a distance corresponding to eight tracks without performing recording (i.e., dummy seek). The control section 77 then produces the dummy data recording signals, while it controls the movement of the optical head 3 for the eight tracks. Eight-track dummy data recording is performed so as to allow the access of data with the optical head 3 for reproduction.

A modulation circuit 94 MFM-modulates one-page image data sequentially supplied from a page buffer 95. The modulated data is then produced by the modulator 94. The modulation circuit 94 also produces a dummy data signal. The modulation circuit 94 comprises a modulator 96 for performing MFM modulation, a pattern generator 97 for generating the dummy data, a track number generator 98 for generating the track number data, an AND gate 99 and an OR gate 100. The modulator 96 MFM-modulates the recording data from the page buffer 95 or the track number data from the track number generator 98 in response to a control signal from the control section 77. The modulated signal is then delivered through the OR gate 100. The pattern generator 97 supplies the dummy data or produces through the OR gate 99 or the track number data from the AND gate also through the OR gate 99, in response to the control signal from the control section 77.

The output signal from the modulator 94, that is, the output signal from the OR gate 100 is supplied to a laser driver 101. The laser driver 101 controls and drives the laser oscillator 4 in accordance with the signal supplied thereto.

The control section 77 has a microprocessor which comprises a CPU 77b, a ROM 77c, a RAM 77d and an I/0 port 77e. An 8-bit microcomputer 8085 manufactured by Intel Corporation, USA may be used in the control section.

A CPU 102 is used to store index title data from an input unit (not shown) and address data of image data stored in the optical disk 1 into an FDK (floppy disk) 104, using a disk controller 103. The CPU 102 detects the final recording address of the image data in accordance with the storage contents of the FDK 104 and produces that address data.

The CPU 102 may comprise an 8-bit microcomputer 8085 manufactured by Intel Corporation.

Figure 4A:
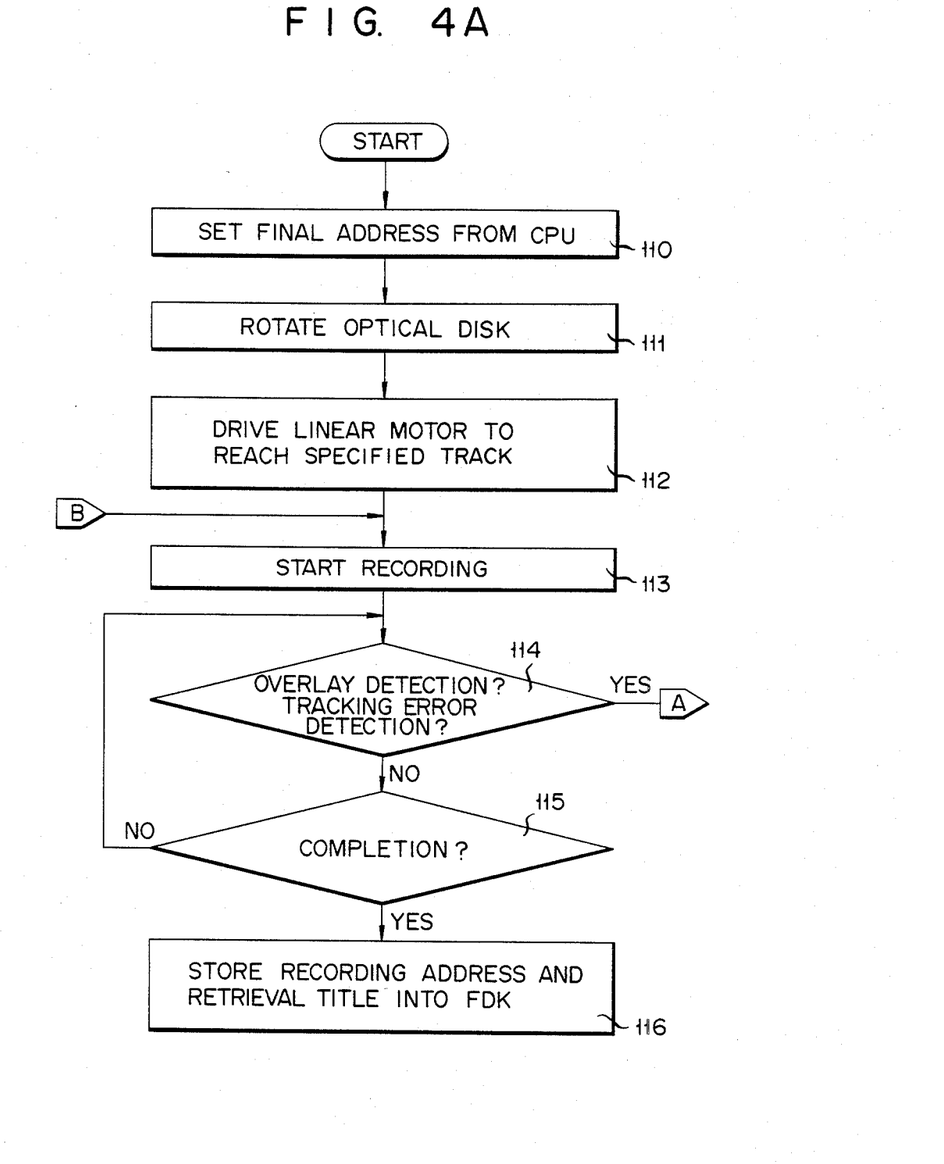
FIGS. 4A and 4B are flow charts for explaining the mode of operation of the apparatus shown in FIGS. 3A and 3B.
Figure 4B:
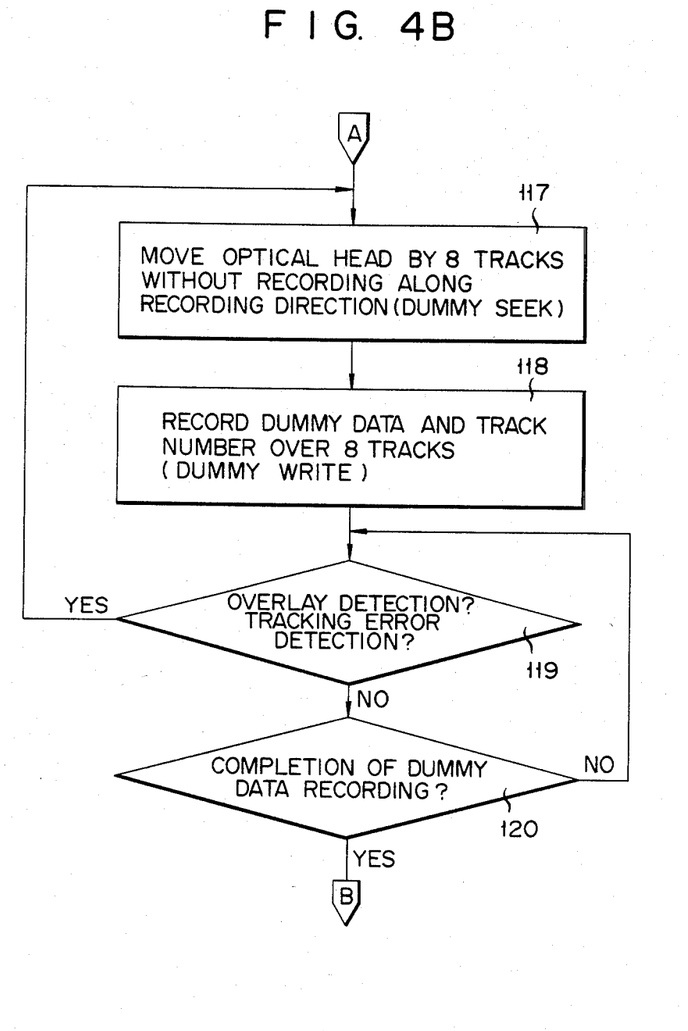

The mode of operation of the data recording apparatus having the construction described above will be described with reference to the flow charts in FIGS. 4A and 4B.

When the operator wishes to record data on the optical disk 1, the final address from the CPU 102 is set in the control section 77 in step 110. In step 111, the optical disk 1 is rotated. The linear motor is energized to drive the optical head 3 to a desired track in step 112. More particularly, the optical head 3 is moved in the radial direction of the optical disk 1 to a desired position, and the reproducing beam is emitted from the laser diode 4. The reproducing beam is then focused by the objective lens 8, thus forming a beam spot on the track of the optical disk 1. In this manner, tracking by the reproducing beam is started. The light reflected from the track of the optical disk 1 is guided to the two-split beam detector 71. The detector 71 photoelectrically converts the optical signal to an electrical signal, which is amplified by the preamplifiers $72_1$ and $72_2$. The output signals from the preamplifiers $72_1$ and $71_2$ are supplied to the envelope wave detectors $74_1$ and $74_2$, respectively. Their envelopes are thus detected. The output signals from the envelope wave detectors $74_1$ and $74_2$ are supplied to the comparator 75. The comparator 75 compares these two signals and produces a signal corresponding to a difference therebetween. Therefore, the driver 76 excites the driving coil 70M in response to the output signal supplied thereto. The galvano-mirror 70 is thus pivoted to constantly trace the central portion of the track with the reproducing beam.

Figures 5A, 5B:
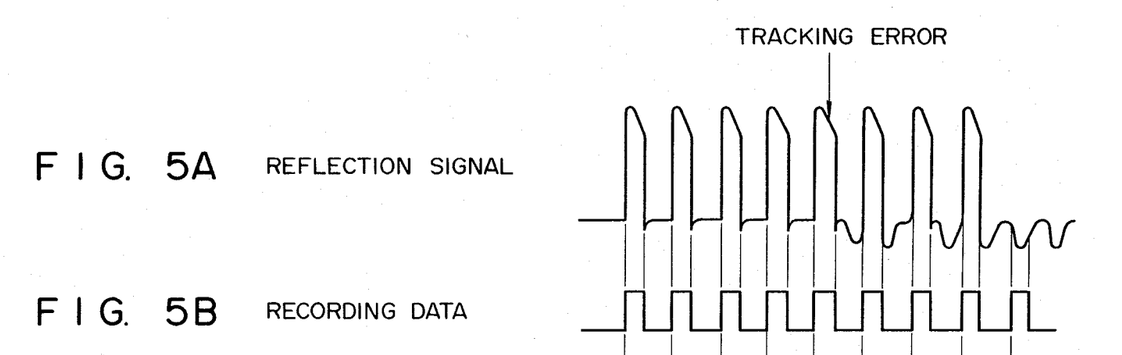
FIG. 5A shows a waveform of a reflection signal.
FIG. 5B shows a waveform of recording data.
Figures 5C, 5D, 5E:
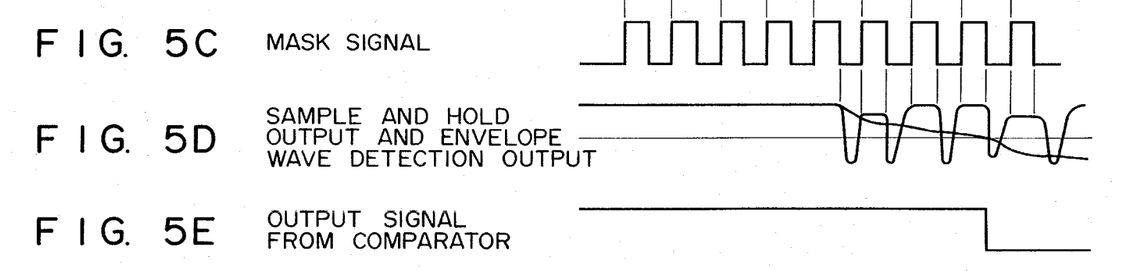
FIG. 5C shows a waveform of a mask signal.
FIG. 5D shows waveforms of a sample and hold output and an envelope wave detection output.
FIG. 5E shows a waveform of an output signal from a comparator.
Figure 6:
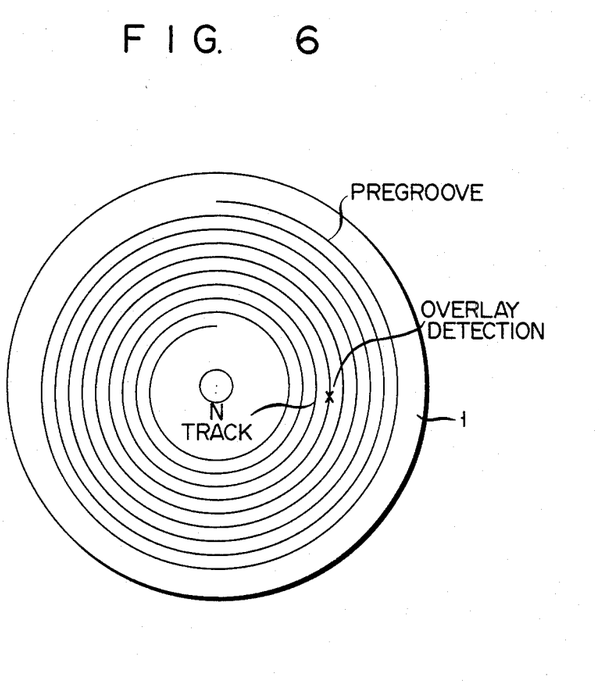
FIG. 6 is a schematic view showing an example of overlay recording on the optical disk.

In step 113, when the control section 77 receives a recording instruction, it supplies the control signal to the modulator 96. The modulator 96 modulates the track number data from the track number generator 98 and the data from the page buffer 95, starting from the first bit. The modulator 96 then supplies the data to the laser driver 101 through the OR gate 100. The laser driver 101 switches the reproducing beam to the recording beam in accordance with the signal supplied thereto, thereby forming data pits in the pregrooves. Meanwhile, the two-split beam detector 71 receives the reflected light from the optical disk 1. The output from the detector 71 is supplied to the adder 79 through the preamplifiers $72_1$ to $72_2$. The output signal from the adder 79 is shown in FIG. 5A. When the mask signal is set at logic level "0", the sample and hold circuit 81 produces the output signals from the preamplifiers $72_1$ and $72_2$ as they are. However, when the mask signal is set at logic level "1", the sample and hold circuit 81 holds the input, so that it produces the immediately preceding signal from the adder 79. When one-page image data is recorded, the control section 77 records the index title and the recording addresses of the image data in the FDK 104 by means of the disk controller 103.

In the recording condition described above, assume that a tracking error occurs due to a strong impact, and that the beam spot of the optical head 3 is shifted to the track on which data is already recorded. The light reflected from the recorded pits is also incident on the two-split beam detector 71. Therefore, the signal corresponding to the above-mentioned light is included in the output signal from the adder 79. The sample and hold circuit 81 therefore produces a signal corresponding to the reflection signal from the recorded pits when the sample and hold circuit 81 is turned on. The detection output from the envelope wave detector 82 is decreased and becomes lower than the slice level. The comparator 90 produces an overlay recording detection signal. The waveforms of signals at the main parts related to the above operation are shown in FIGS. 5A though 5F. In step 117, the control section 77 drives the linear motor drive 92. The optical head 3 is then shifted by eight tracks. In this case, the control section 77 does not supply any control signal to the modulation circuit 94. It is regarded that the optical head 3 performs 8-track dummy seek. Thereafter, the control section 77 supplies the control signals to the pattern generator 97 and the AND gate 99, and at the same time drives the linear motor driver 92. As a result, the pattern generator 97 supplies the dummy data and the track number data from the track number generator 98 every 0.5 m/s. In step 118, the laser driver 101 switches the reproducing beam to the recording beam in accordance with the signal supplied thereto, thereby forming data pits of the dummy data and the track number data in the pregrooves. When the dummy data and the track number data are recorded on the eight tracks, the control section 77 supplies the control signal to the modulator 96. The modulator 96 then modulates the data signal read out from the page buffer 95. That is, the bits of the data signal are modulated one at a time, starting from the first bit. The modulator 96 produces the modulated signal and the track number signal. The laser driver 101 switches the reproducing beam to the recording beam in accordance with the signal supplied thereto, thereby forming data pits in the pregrooves.

In one-page image data recording, when an error such as a tracking error occurs, a plurality of tracks are subjected to dummy seek. When dummy track recording is completed, the one-page image data can be properly recorded. When the dummy tracks are accessed, one of the eight dummy tracks can be accessed.

When overlay recording occurs, new recording can be properly performed after unit (two or three tracks) image data. Even if an irregular recording portion is present, that is, even if pinholes are formed in the recording film along the plurality of tracks, image data can be properly recorded avoiding such a portion.

In the above recording condition, even if an error is detected by the tracking error detector 85, the apparatus is operated in the same manner as it detects overlay recording. Furthermore, when a power failure occurs during recording, the recording addresses may not be written in the FDK 104 although the final image data is recorded on the optical disk 1. In this condition, when power is supplied again and the operator wishes to perform recording, recording is started from the Nth track, thus detecting overlay recording. The apparatus is operated in the same manner as in the detection of overlayer recording. Image data to be recorded is recorded from the beginning.

What we claim is:

1. A data recording apparatus, comprising:
   (a) recording/reproduction head means for recording data on a recording medium having a plurality of tracks formed at a predetermined trace pitch, for reproducing the data from the recording medium and for detecting and outputting a detection result corresponding to a desired recording start track;
   (b) moving means, connected to said recording/reproduction head means, for moving said recording/reproducing head means on the recording medium;
   (c) position detecting means having a predetermined scale pitch for detecting the position of the head and for outputting a scale value corresponding to positions of the recording medium:
   (d) scale translating means for translating a desired track number to a scale value corresponding to said scale value detected by said position detecting means in accordance with the track and scale pitches;
   (e) driving means, connected to said scale translating means, said position detecting means and said moving means, for driving said moving means until the scale value from said scale translating means coincides with the scale value detected by said position detecting means; and
   (f) controlling means, connected to said recording/reproduction head means, said position detecting means, said scale translating means, and said driving means, for detecting when access to the recording start track cannot be made by said recording/reproduction head for recording the data, for determining a track number in the vicinity of the recording start track in accordance with said detection result output by said recording/reproduction head means, and for controlling said recording/reproduction head means, said position detecting means, said scale translating means and said driving means so as to move said recording/reproduction head means to a target track ahead of a predetermined number of tracks which corresponds to a distance between the target track and the recording start track.

2. An apparatus according to claim 1, wherein the predetermined number of tracks corresponding to the distance between the recording start track and the track in the vicinity of the recording start track corresponds to a sum of the distance between the recording start track and the track corresponding to said recording/reproducing head and a width of a predetermined number of tracks.

3. An apparatus according to claim 1, wherein said controlling means comprises a programmable microprocessor connected to said scale translating means, said position detecting means and said moving means, said programmable microprocessor including a central processing unit for receiving data to compute the track pitch data and a read-only memory device for storing a permanent program for functions of said central processing unit, thereby allowing said controlling means to execute a predetermined function, wherein said controlling means detects that the recording start track cannot be accessed by said recording/reproduction head means for recording the data, determines the track number in the vicinity of the recording start track in accordance with the detection result from said recording/reproduction head means, and controls said recording/reproduction head means, said position detecting means, said scale translating means and said driving means so as to move said recording/reproduction head means to the target track ahead of the predetermined number of tracks which corresponds to the distance between the target track and the recording start track.

4. An apparatus according to claim 3, wherein the predetermined number of tracks corresponding to the distance between the recording start track and the track in the vicinity of the recording start track corresponds to a sum of the distance between the recording start track and the track corresponding to said recording/reproducing head and a width of a predetermined number of tracks.

5. A data recording apparatus, comprising:
(a) a recording/reproduction head means for recording data on a recording medium having a plurality of track formed at a predetermined trace pitch and for reproducing the data from the recording medium;
(b) moving means, connected to said recording/reproduction head means, for moving said recording/reproducing head means on the recording medium;
(c) error detecting means, connected to said recording/reproduction head means, for detecting an error in accordance with a signal from said recording/reproduction head means in a recording mode and for outputting a corresponding error signal; and
(d) controlling means, connected to said recording/reproduction head means, said moving means, and said error detecting means, for controlling said moving means such that said recording/reproduction head means is moved by a distance corresponding to a predetermined number of tracks in accordance with said error signal output from said error detecting means without performing recording.

6. An apparatus according to claim 5, wherein said controlling means controls said moving means to move said recording/reproduction head means by the distance corresponding to the predetermined number of tracks in accordance with said error signal output from said error detecting means without performing recording so as to record dummy data on the predetermined number of tracks.

7. An apparatus according to claim 5, wherein said controlling means comprises a programmable microprocessor connected to said recording/reproduction head, said moving means and said error detecting means, said programmable microprocessor including a central processing unit for receiving data to compute the track pitch data and a read-only memory device for storing a permanent program for functions of said central processing unit, thereby allowing said controlling means to execute a predetermined function, wherein said controlling means controls said moving means so as to move said recording/reproduction head means without performing recording for the predetermined number of tracks in accordance with the error signal output from said error detecting means.

8. An apparatus according to claim 7, wherein said controlling means controls to move said recording/reproduction head means by the distance corresponding to the predetermined number of tracks in accordance with the error signal output from said error detecting means without performing recording so as to record dummy data on the predetermined number of tracks.

* * * * *